ated Nov. 28, 1961

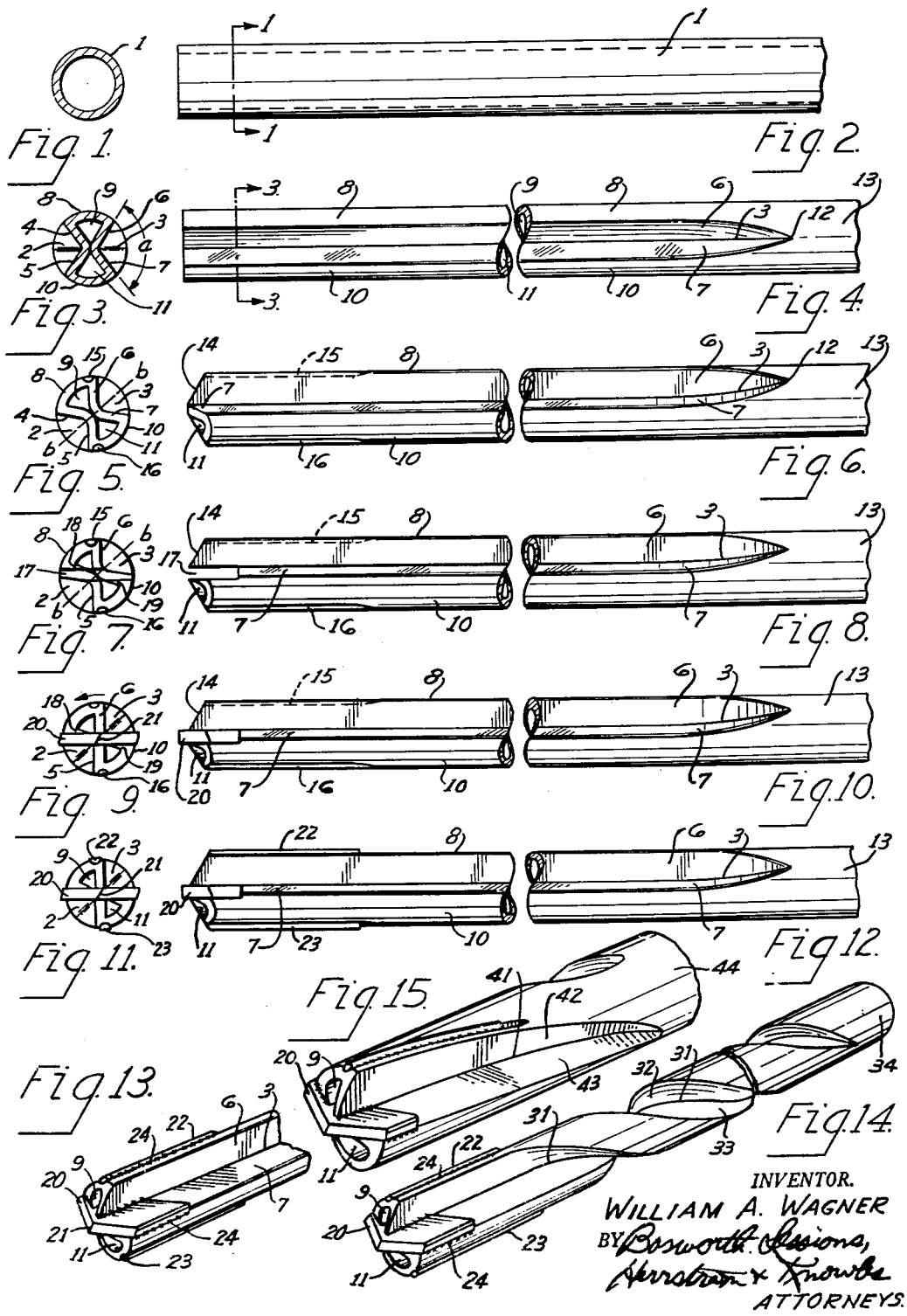

3,010,345
TUBE DRILL
William A. Wagner, South Euclid, Ohio, assignor to The Cleveland Twist Drill Company, Cleveland, Ohio, a corporation of Ohio
Filed Aug. 25, 1958, Ser. No. 757,015
7 Claims. (Cl. 77—68)

This invention relates to an oil-conduit tube drill and, more particularly, to such a tube drill provided with an inserted cutting tip.

Oil-conduit tube drills are known in the prior art, including types in which the walls of the tube are indented with or without prior reduction in wall thickness to facilitate the indenting operation. In some instances, the tube itself has been pointed to provide the desired cutting edges. In other tube drills, inserted cutting tips have been used, particularly in tube drills of kinds in which there are no indentations at all (i.e., no flutes) or at the most only a single flute formed by indentation of the tube in a single quadrant.

Tipped tube drills of the kinds so far mentioned often do not permit of or provide the maximum degree of support for the cutting tip. This is particularly true in the case of tipped tube drills with no flutes, in which, as a general rule, the cutting tip is supported only where slots in which the tip is mounted are formed in the walls of the tube; viz., by four narrow areas of which one pair is on one side and the other pair is on the opposite side of the tube. This situation is not improved to any considerable extent in the case of tube drills with a single flute, in which the practice is to form the slot for the cutting tip by cutting away or otherwise eliminating one of the walls of the flute developed by the indenting step.

The invention has for its principal object to provide an oil-conduit tube drill with a slot-mounted cutting tip in which the cutting tip is supported to a substantial degree on both sides of the chisel edge, on one side by the butt end of one of the walls of a first flute and on the other side by the butt end of the diametrically opposite wall of a second flute. Supplemental support is provided by the face of the slot in the portion of the tube which forms the land of the drill behind the outside portion of the cutting edge. The tip is bonded to these supporting surfaces, as, for example, by brazing.

In general, the invention contemplates an oil-conduit tube drill characterized, among other things, by a plurality of generally V-shaped flutes formed by the walls of indentations on opposite sides of the tube; by a built-up or double web where the flute walls impinge on each other; by an inserted cutting tip positioned at an angle of approximately 45° to the plane in which, conventionally, the thickness of the web is measured; by cylindrically surfaced wear strips of suitable material in zones from 60° to 90° removed from the general plane of the cutting tip; and by a plurality of oil conduits so positioned that the coolant contacts and cools the back of the cutting tip. Such a drill is particularly useful for drilling deep, straight holes in metals.

tube encloses two generally triangular oil passages which follows, this arrangement gives rise to a tube drill with an inserted cutting tip in which the tip is not supported entirely or largely in radially opposed slots in the outer periphery of the tube, as is commonly the case where the tube has either no flutes at all or only a single flute, but in considerably greater measure by four surfaces to which the tip is bonded each of which forms part of one of four substantially diametrically disposed flute walls. The cutting tip itself forms the web of the drill at the point thereof and with the remaining walls of the tube encloses two generally triangular oil passage which contact and cool it.

By locating the cutting tip as herein described, none of the four flute walls, even though certain of them may be of reduced thickness where the sides of the cutting tip bear against them, is entirely eliminated. On the contrary, at least a part of each wall of each flute remains in place to enable the cutting tip to bear against it and be supported by it. Two of the flute walls actually butt up against the tip. Guides of the nature of wear strips may or may not be present, as desired. This combination of features provides an especially solid backing for the tip on both sides of its chisel edge and enables an increased feed rate not achieved by other drills made from tubular stock.

Other objects, advantages and features of the invention will be apparent from the description which follows and from the accompanying drawings, in which:

FIGURES 1 and 2 show, respectively, a section and a side elevation of a thin walled tube that may be employed to advantage in the practice of the invention.

FIGURES 3 and 4 show, respectively, a section and side elevation of the same tube after it has been indented on opposite sides to form two diametrically opposed flutes separated from each other by a built-up or double web.

FIGURES 5 and 6 show, respectively, an end elevation and a side elevation of the tube after half-round slots have been formed in it for the reception of wear strips, the tube being shown in a different position from that occupied in FIGURES 3 and 4.

FIGURES 7 and 8 are elevations similar to FIGURES 5 and 6, respectively, showing the tube after introduction of the slot which is to receive the cutting tip.

FIGURES 9 and 10 are corresponding elevations showing the tube drill of the invention with the cutting tip in position.

FIGURES 11 and 12 are corresponding elevations showing the tube drill of the invention as it appears after the incorporation of wear strips.

FIGURE 13 is a fragmentary perspective of the leading end of the tube drill of FIGURES 11 and 12.

FIGURE 14 is a perspective of a modification in which the flutes spiral rearwardly from a zone immediately to the rear of the trailing ends of the wear strips.

FIGURE 15 is a perspective of another modification in which the flutes spiral rearwardly from the point of the drill.

In making the tube drill of the present invention one may start with a thin walled tube; i.e., one in which the relation between wall thickness and outer diameter is approximately as indicated in FIGURES 1 and 2. In a typical case, one may use a tube having a nominal outside diameter of ½" in which the wall thickness is of the order of 1/16", although the wall thickness may be greater or less and the outer diameter may be of a different order of magnitude. A thick walled tube may be used if longitudinally extending flats or relieved areas serving to reduce the wall thickness are formed on opposite sides of the tube in those quadrants in which the walls are to be indented to form the flutes. In a tube intended for use in accordance with the teachings of the invention, a 50-point carbon steel may conveniently be used.

Assuming the use of a thin walled tube of the type shown in FIGURES 1 and 2, the first step is to indent the side walls in diametrically opposed quadrants to produce flutes 2 and 3. The flute angle, that is to say, the angle $a$ in FIGURE 3, may measure from 75° to 110°. Preferably, it is slightly greater than 90°, although not so much greater that it cannot be described as roughly a right angle. Indentations 2 and 3 may be produced in any convenient fashion, as by crimping, swaging, hammering or the like. The step of indenting the walls of the tube is carried to the point where the walls of the flutes approach or impinge on each other, thus forming the built-up or double web appearing in FIGURE 3. As there shown, flute 2 has two flat side walls 4 and 5; similarly, flute 3 has two flat side walls 6 and 7. At this stage, the tube still has the squared end seen at the left in FIGURES 2 and 4.

Referring to FIGURE 3, it will be noted that between wall 4 of flute 2 and wall 6 of flute 3 the section is characterized by a sector-shaped portion the curved periphery or arc of which measures a bit less than 1½ radians. This arc defines the outer face of a longitudinally extending land 8. Within it is a generally triangular opening 9 that is to serve as an oil hole. On the opposite side of the tube between wall 5 of flute 2 and wall 7 of flute 3 is a similar longitudinally extending land 10. Within land 10 is a second generally triangular oil hole 11. Separating the two lands from each other are the two flutes, the trailing end of each of which terminates in a point, as at 12 in FIGURE 4. Beyond point 12 is shank 13, which may be regarded as a non-fluted continuation of the drill body. This shank may be adapted by any conventional means to fit the mechanism of a drilling machine, as by means of a sleeve.

It will be noted from FIGURE 3 that in a general way flute walls 4 and 7 may be said to be in radial alignment with each other; i.e., diametrically disposed, and that in the same sense flute walls 5 and 6 may be said to be in radial alignment with each other. This alignment need not be precise so long as opposing flute walls 4 and 7 do in fact approach each other at the center. The same holds for opposing flute walls 5 and 6. Conventionally, in determining web thicknesses the practice is to measure the web transversely where its width is narrowest. In the present case, this is along a line bisecting angle $a$ and the equal but opposite angle on the other side of the tube. In FIGURES 5 and 7, which show end elevations of the tube after it has been pointed to give it the conical surface indicated at 14 in FIGURES 6 and 8, this line is designated $b$—$b$. If a plane paralleling the longitudinal axis of the tube were passed through line $b$—$b$, it would pass through the remote ends of flutes 2 and 3; viz., through point 12 (FIGURE 4). It will be seen from FIGURES 5 and 7 that the side walls of the two flutes extend at angles of approximately 45° to a plane so passed through line $b$—$b$.

FIGURES 5 and 6 on one hand and FIGURES 7 and 8 on the other illustrate the results of operations on the tube to provide for the later introduction of the cutting tip and of two guides of the nature of wear strips. The order in which the two operations are performed on the tube is not important. Either may precede the other, although in the accompanying drawings FIGURES 5 and 6 illustrate the tube as it appears after being provided with half-round slots 15 and 16 for the later reception of wear strips and FIGURES 7 and 8 illustrate it as it appears after the further introduction of a longitudinally extending slot 17 for the cutting tip. The location of slot 17 on one hand and the location of half-round slots 15 and 16 on the other are of importance, as will appear. The latter slots may, if desired, be rectangular rather than half-round in section.

Further with reference to FIGURES 7 and 8, it should be noted that slot 17 extends diametrically across the tube substantially at right angles to side wall 5 of flute 2 and side wall 6 of flute 3. Thus when the cutting tip is inserted in slot 17, the ends of walls 5 and 6 can butt up against and support the cutting tip. From a comparison of FIGURES 5 and 7, it will be noted that slot 17 does not completely cut away side wall 4 of flute 2 or side wall 7 of flute 3; on the contrary, tip-supporting fins or fin-shaped fillets of generally triangular shape remain after slot 17 has been cut. Fillet 18 represents what is left of side wall 4; fillet 19, what is left of side wall 7. The two fin-like fillets, which in a given case may be longer or shorter than those shown, assist materially in supporting the cutting tip.

Assuming that the tubular drill produced by inserting and holding cutting tip 20 in slot 17 is to rotate in the direction shown by the arrow (FIGURE 9), tip 20 should be formed, located and bonded in position substantially as indicated in FIGURES 9 to 13. Preferably, its two lateral edges, i.e., those edges which in FIGURE 9 appear to parallel chisel edge 21, should be caused to project outwardly of the drill body more or less as shown. In FIGURES 9 and 10, it is assumed that tip 20 is incorporated in the drill body before the incorporation of wear strips 22 and 23 (FIGURES 11 to 13); however, if desired it is possible to incorporate the wear strips first, introducing them into slots 15 and 16 in zones from 60° to 90° removed from the general plane of tip 20, before introducing the tip itself into slot 17.

The brazing or other bond by which the tip and wear strips are held in place is indicated at 24 in FIGURE 13.

With the drill assembled to the extent indicated in FIGURES 11 and 12, the cutting edges of tip 20 and those surfaces of wear strip 22 and 23 which are to act as guides are ground to the desired shape, including suitable lip and body relief, thereby giving the leading end of the drill the general appearance shown in FIGURE 13. However, it is not necessary to the practice of the invention that the drill be a straight drill such as is illustrated in FIGURE 13. Instead, it may, if desired, be twisted over much of its length.

In FIGURE 14, for example, the leading end of the drill is formed as before, but flute 31, which is formed by side walls 32 and 33, spirals rearwardly toward shank 34 from a zone immediately to the rear of the trailing ends of wear strips 22 and 23. In such case, the twisted contour may be introduced before cutting tip 20 and wear strips 22 and 23 are incorporated in the drill body. A further modification appears in FIGURE 15, which shows a drill body of shorter overall length but greater diameter. In this case flute 41, defined by side walls 42 and 43, extends all the way from the point of the drill body to shank 44. At the leading end of the drill body of FIGURE 15, the cutting tip and wear strips are generally similar to those previously described and are similarly incorporated in the drill body.

It is evident that changes may be made in the specific form of the drill without departing from the basic concepts of the invention, which have to do more with the configuration at the leading end of the drill body than with other features. Particularly significant, especially in the form of the invention shown in FIGURES 1 to 13, is the fact that the cutting tip is held in place both by fin-like fillets 18 and 19 and by the squared off ends of flute walls 5 and 6 where the latter are cut away to form slot 17. This construction offers a number of advantages as regards the manner in which the cutting tip is secured and maintained in position in the leading end of the drill body, including the important practical advantage of a very high degree of rigidity. It provides efficient cooling action by directing the flow of high-velocity coolant against the back of the cutting tip. The coolant escapes thence into the flutes and as it does so carries the chips with it, thus flushing them out of the hole.

It is intended that the patent shall cover, by summarization in appended claims, all features of patentable novelty residing in the invention.

What is claimed is:
1. A tipped tube drill characterized by longitudinally extending flutes separated from each other by longitudinally extending lands comprising an oppositely fluted tubular drill body in which the flutes are formed by generally V-shaped indentations that extend over much of the length of the drill body, in which the included flute angle measures roughly 90°, and in which the flute walls impinge on each other along the axis of the drill body to form a built-up web; a pointed end on the drill body with a diametrical slot dividing it into two sector-shaped surfaces each of which is characterized by a generally triangular opening that extends as an oil conduit through the drill body from one end thereof to the other, said slot being formed in and defined in part by triangular fillets remaining as portions of two radially aligned flute walls; a cutting tip bonded in said slot and supported on both sides of its chisel edge by butt ends of flute walls and at both of its outside edges by butt ends of the tube wall, space being left between the supporting surfaces on both sides of the cutting tip to permit the coolant to contact and cool the rearward portion of the cutting tip, said cutting tip bonding the flute walls together to form a rigid web.

2. A tipped tube drill characterized by longitudinally extending flutes separated from each other by longitudinally extending lands comprising an oppositely fluted tubular drill body in which the flutes are formed by generally V-shaped indentations that extend over much of the length of the drill body, in which the included flute angle measures roughly 90°, and in which the flute walls impinge on each other along the axis of the drill body to form a built-up web; a pointed end on the drill body made up of sector-shaped areas each of which is characterized by a generally triangular opening that extends through the drill body from one end thereof to the other; wear strips extending rearwardly from said sector-shaped areas along the trailing edges of the lands; a transverse slot in the pointed end of the drill body, said slot being formed in two radially aligned flute walls substantially at right angles to two other radially aligned flute walls; and, occupying said slot, a separate cutting tip the lateral edges of which extend outwardly beyond said sector-shaped areas, said cutting tip being backed on each of its two sides by a triangular fillet formed from one of the two radially aligned flute walls in which the slot is formed.

3. A tipped tube drill according to claim 2 in which said other radially aligned flute walls butt up against the tip substantially at right angles thereto on opposite sides of the chisel edge.

4. In a tipped oil-conduit drill characterized by longitudinally extending flutes separated from each other by longitudinally extending lands comprising an oppositely fluted drill body in which the flutes are defined by the walls of a tube that has been indented over much of the length of the tube, the included flute angle measuring roughly 90°, and in which the tube walls impinge on each other along the axis of the drill body to form a built-up web, a pointed forward end on the drill body having a slot formed in two radially aligned flute walls substantially at right angles to two other radially aligned flute walls, said slot having bonded to its walls a web-stiffening cutting tip backed on each of its two sides by a triangular fillet formed from one of the two radially aligned flute walls in which the slot is formed.

5. A tipped tube oil conduit drill according to claim 4 provided with wear strips so positioned on the periphery of the pointed forward end of the drill body that each cutting edge has a wear strip associated with it in a zone from 60° to 90° removed from the general plane of the cutting tip.

6. A drill comprising a straight-fluted tubular drill body in which alternating lands and flutes are formed by two generally V-shaped indentations, in which the walls of the flutes impinge on each other along the axis of the drill body to form a built-up web, and in which the walls of the flutes extend at angles of roughly 45° to the plane of minimum web thickness; a pointed end on the drill body having two opposed sector-shaped areas corresponding to said lands each of which sector-shaped areas is characterized by a generally triangular opening that extends into the drill body; guides of the nature of wear strips projecting outwardly beyond said sector-shaped areas and extending rearwardly therefrom along said lands, said wear strips serving to rigidify the pointed end of the drill body; a slot in the pointed end of the drill body, said slot replacing two radially aligned flute walls and extending substantially at right angles to each of two other radially aligned flute walls; and, occupying said slot, a separate cutting tip the lateral edges of which project outwardly beyond said sector-shaped areas in substantially the same manner as the wear strips, said wear strips being from 60° to 90° removed from said lateral edges.

7. A drill according to claim 6 in which the length of the wear strips is approximately twice the cutting diameter of the drill.

References Cited in the file of this patent

UNITED STATES PATENTS

| | | |
|---|---|---|
| 552,065 | King | Dec. 24, 1895 |
| 1,022,135 | Heinkel et al. | Apr. 2, 1912 |
| 1,208,164 | Kelly | Dec. 12, 1916 |
| 2,903,921 | Andreasson | Sept. 15, 1959 |

UNITED STATES PATENT OFFICE
CERTIFICATION OF CORRECTION

Patent No. 3,010,345                                          November 28, 1961

William A. Wagner

It is hereby certified that error appears in the above numbered patent requiring correction and that the said Letters Patent should read as corrected below.

Column 1, line 60, for "tube encloses two generally triangular oil passages" read -- As will appear from the detailed description --; line 71, for "passage" read -- passages --.

Signed and sealed this 17th day of April 1962.

(SEAL)
Attest:

ESTON G. JOHNSON
Attesting Officer

DAVID L. LADD
Commissioner of Patents